United States Patent [19]
McKay

[11] 3,870,879
[45] Mar. 11, 1975

[54] MEANS AND METHOD FOR PROVIDING AN OUTPUT CORRESPONDING TO THE EXPECTED SUBSIDENCE OF A FROZEN EARTH FORMATION

[75] Inventor: Alexander S. McKay, Calgary, Alberta, Canada

[73] Assignee: Texaco Exploration Canada Ltd., Calgary, Alberta, Canada

[22] Filed: July 5, 1973

[21] Appl. No.: 376,768

Related U.S. Application Data

[62] Division of Ser. No. 296,422, Oct. 10, 1972.

[52] U.S. Cl. .................. 250/269, 175/50, 250/261
[51] Int. Cl. .............................................. G01t 1/16
[58] Field of Search .................. 250/261, 262, 269; 181/.5 BE; 175/40, 41, 50

Primary Examiner—Harold A. Dixon
Attorney, Agent, or Firm—T. H. Whaley; C. G. Ries

[57] ABSTRACT

Apparatus including a well logging tool and surface equipment provides an output substantially corresponding to the expected subsidence of a frozen earth formation upon thawing.

8 Claims, 2 Drawing Figures

PATENTED MAR 11 1975    3,870,879
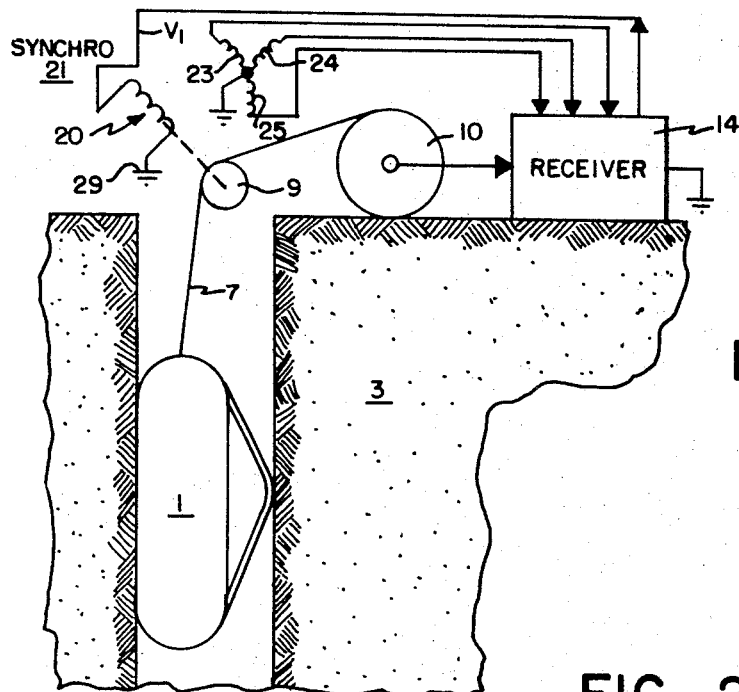
FIG. 1
FIG. 2
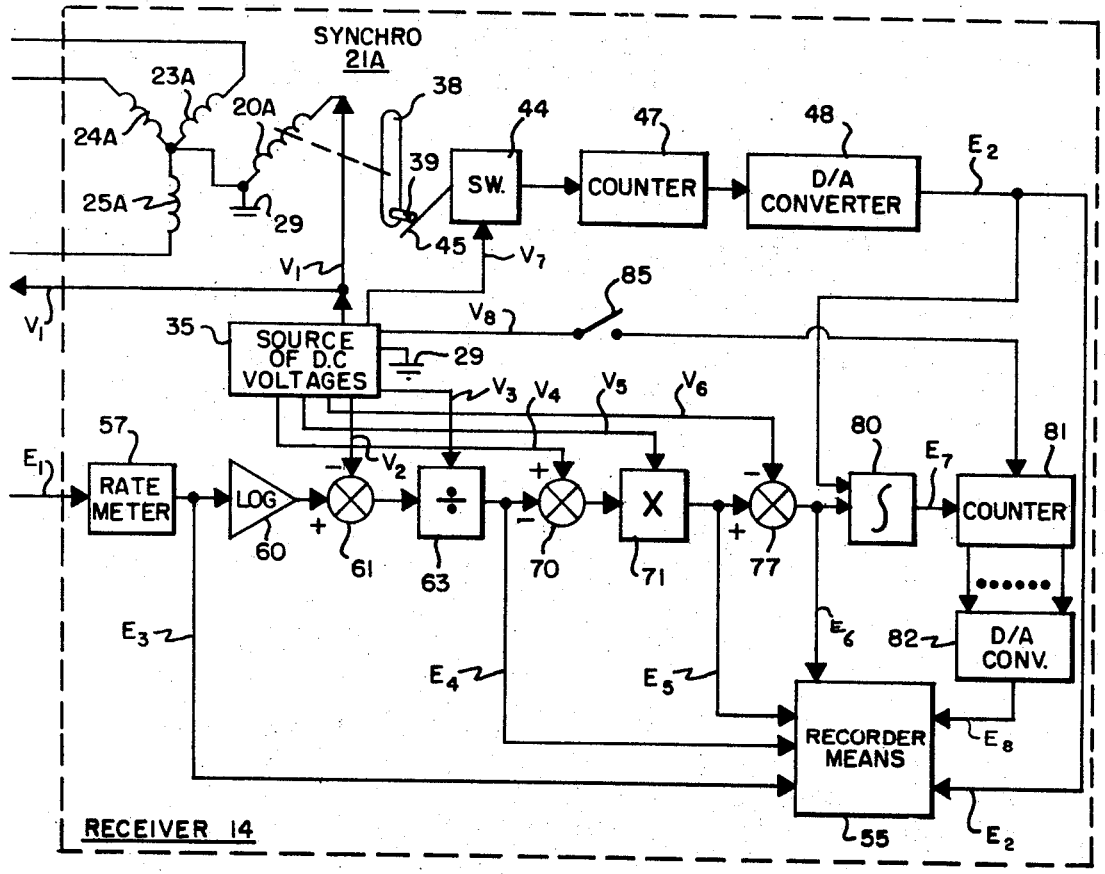

3,870,879

MEANS AND METHOD FOR PROVIDING AN OUTPUT CORRESPONDING TO THE EXPECTED SUBSIDENCE OF A FROZEN EARTH FORMATION

This is a, division, of application Ser. No. 296,422, filed Oct. 10, 1972.

BACKGROUND OF THE INVENTION

Field of the Invention

The apparatus of the present invention is related to well logging equipment.

SUMMARY OF THE INVENTION

Apparatus provides an output corresponding to the expected subsidence of a frozen earth formation upon thawing. The apparatus includes a sensor which is inserted in a borehole in the frozen earth formation. The sensor provides a signal to surface equipment corresponding to a sensed characteristic of the frozen earth formation. Circuitry converts the signal from the sensor to a signal corresponding to the density of the frozen earth formation. A network provides the output corresponding to the expected subsidence in accordance with the density signal.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for illustration purposes only and is not to be construed as defining the limits of the invention.

DESCRIPTION OF THE DRAWINGS

FIG. 1 shows apparatus, constructed in accordance with the present invention, for measuring and recording the expected subsidence of a frozen earth formation, the density of the formation and the ice content of the formation.

FIG. 2 is a detailed block diagram of the receiver shown in FIG. 1.

DESCRIPTION OF THE INVENTION

Structures that provide heat in permafrost areas causes the permafrost to thaw. The settling of the structure due to the thaw may cause damage to the structure. Such damage can be avoided if it can be determined in advance how much settling there would be. The device of the present invention provides a record of the expected subsidence of the earth resulting from a thawing of the permafrost.

Referring to FIG. 1, a logging tool 1 is lowered in a borehole in earth formation 3. Logging tool 1 is fully described and disclosed in U.S. Pat. No. 2,972,682. Logging tool 1 provides pulses $E_1$ corresponding to detected gamma radiation which is related to the density of the earth formation 3. Pulse $E_1$ is provided to a receiver 14 by way of a cable 7. Cable 7 passes over a wheel 9 and is connected to a reel 10. Reel 10 is electrically connected to receiver 14 which is described hereinafter.

As wheel 9 rotates due to logging tool 1 being lowered into the borehole, it drives a rotor winding 20 of a direct current synchro 21, having stator windings 23, 24 and 25 with a common connection to ground 29. Rotor winding 20 has one end connected to ground 29 and the other end receiving a direct current voltage $V_1$.

As rotor winding 20 rotates due to the rotation of wheel 9, induced voltages across stator windings 23, 24 and 25 vary accordingly. The induced voltages across stator windings 23, 24 and 25 are provided to receiver 14.

Referring to FIG. 2, the voltages from stator windings 23, 24 and 25 are applied across corresponding stator windings 23A, 24A and 25A, having common connection to ground 29 of direct current synchro 21A. Synchro 21A has a rotor winding 20A receiving voltage $V_1$ from a source 35 of direct current voltages which is connected to ground 29 and also provides direct current voltages $V_2$ through $V_8$. Rotor winding 20A of synchro 21A rotates in accordance with the signals applied across stator windings 23A, 24A and 25A. Rotor winding 20A is mechanically connected to an arm 38 so that arm 38 rotates in accordance with the rotation of wheel 9. Arm 38 has a peg 39 inserted into it at a right angle. A conventional type limit switch 44 receiving a direct current voltage $V_7$ from source 35 and having an arm 45 arranged with respect to arm 38 and peg 39 so that once every cycle peg 39 momentarily activates switch 44 causing switch 44 to provide a pulse output.

A counter 47 counts each pulse provided by switch 44. A conventional type digital-to-analog converter 48 converts digital signals provided by counter 47 to provide a signal $E_2$ corresponding to the depth of the logging tool in the borehole. Signal $E_2$ is used to drive five channel recording means 55 so that recorded signals, as hereinafter explained, are referenced to the depth at which the information represented by the signals is related to.

Pulses $E_1$ from logging tool 1 are applied to a conventional type rate meter 57 which provides a signal $E_3$, corresponding to the pulse rate, to recording means 55 so that the pulse rate may be recorded. Signal $E_3$ is also converted to a signal $E_4$ which corresponds to density of the earth formation in accordance with the following equation:

$$D = (\log R - S)/k \tag{1}$$

where $D$ is the density, $k$ and $S$ are constants and may by way of example have values of $-0.219$ and $3.415$, respectively, and $R$ is the pulse rate.

A logarithmic amplifier 60, subtracting means 61 and a divider 63 cooperate to provide density signal $E_4$. Logarithmic amplifier 60, receiving signal $E_3$, provides an output corresponding to the term $\log R$ in equation 1; subtracting means 61 subtracts voltage $V_2$, corresponding to constant S, from the output provided by amplifier 60 to provide a signal related to term $\log R - S$ in equation 1. Divider 63 divides the signal from subtracting means 61 with voltage $V_3$, corresponding to the constant $k$, to provide signal $E_4$. Signal $E_4$ is applied to recording means 55 and to subtracting means 70. Recording means 55 records signal $E_4$ to provide a record of the density of earth formation 3.

Subtracting means 70 cooperates with a multiplier 71 to solve the following equation:

$$I_V = 57(2.65 - D) \tag{2}$$

where $I_V$ is the percent volume of ice in earth formation 3. Subtracting means 70 subtracts signal $E_4$ from a voltage $V_4$, which corresponds to a typical matrix density term 2.65 in equation 2, to provide a signal corresponding to the term $(2.65-D)$. The soil matrix density will usually fall between 2.60 and 2.75 gm/cc and will be essentially constant in a given area. Multiplier 71 multiplies the signal from subtracting means 70 with voltage $V_5$, which corresponds to the term 57 in equation 2 to provide a signal $E_5$ corresponding to the term $I_V$ in equation 2. Signal $E_5$ is applied to recording means 55 and to subtracting means 77. Recorder 55 records signal $E_5$ to provide a record of the percent volume of ice in earth formation 3.

Subtracting means 77 subtracts voltage $V_6$, which corresponds to the term C in the following equation 3, from signal $E_5$ to provide a signal $E_6$ corresponding to the percent volume of excess ice $I_{exc}$ in accordance with the following equation:

$$I_{exc} = I_V - C \qquad (3)$$

where C is the residual thaw porosity and has a predetermined value between 45 and 75 percent.

The expected subsidence of S of a frozen earth formation may be determined from equation 4.

$$S = \int_0^z I_{exo} dz \qquad (4)$$

where $dz$ is an increment of depth and $z$ is the furthest depth of logging.

Signal $E_6$ from multiplier 77 is applied to an integrator 80 which also receives signal $E_2$. Integrator 80, which may be of a conventional type, integrates signal $E_6$ as a function of signal $E_2$ to provide pulses $E_7$. Pulses $E_7$ correspond to $\int I_{exc} dz$. Pulses $E_7$ are counted by a counter 81. Counter 81 provides a plurality of digital outputs corresponding to its content to a conventional type digital-to-analog converter 82. The content of counter 81 corresponds to the expected subsidence since the count starts at zero depth and is stopped when logging tool 1 is stopped at depth $z$. Converter 82 converts the outputs from counter 81 to an analog signal $E_8$ corresponding to the expected subsidence of frozen earth formation 3 upon thawing. Signal $E_8$ is applied to recording means 55.

After the logging operation has been terminated, a conventional type 'momentary on' switch 85 is activated to momentarily pass a direct current voltage $v_8$ provided by source 35. The passed voltage $V_8$ resets counter 81.

The system of the invention heretofore described provides an output corresponding to the expected subsidence of a frozen earth formation upon thawing. The system further provides records of the density of the frozen earth formation, the percent volume of ice in the earth formation, and the excess ice.

What is claimed is:

1. A method for providing an output corresponding to the expected subsidence of a frozen earth formation, having a borehole, upon thawing, which comprises the following steps of inserting a sensor in the borehole, sensing a characteristic of the frozen earth formation with the sensor, providing a signal corresponding to the sensed characteristic, providing a signal corresponding to the density of the frozen earth formation in accordance with the sensed characteristic signal, and providing the output corresponding to the thaw subsidence in accordance with the density signal.

2. A method as described in claim 1, in which the sensing step includes irradiating the frozen earth formation with gamma rays, detecting gamma radiation from the frozen earth formation, and providing pulses corresponding in number to the detected gamma radiation as the characteristic signal.

3. A method as described in claim 2 in which the density signal step includes providing a signal corresponding to the pulse rate R of the pulses in the characteristic signal, and providing a signal corresponding to density D of the frozen earth formation in accordance with the pulse rate R signal and the following equation:

$$D = (\log R - S)/k$$

4. A method as described in claim 3 in which the subsidence output step includes providing a signal corresponding to the ice content of the frozen earth formation in accordance with the density signal, and providing a subsidence signal as the subsidence output in accordance with the ice content signal.

5. A method as described in claim 4 which further comprises moving the sensor through the borehole, and providing a signal corresponding to a distance through which the sensor has been moved.

6. A method as described in claim 5 in which the ice content signal step includes providing a signal corresponding to the percent volume of ice $I_V$ in the frozen earth formation in accordance with the density signal and the following equation:

$$I_V = 57(2.65 - D),$$

providing a signal corresponding to a predetermined residual thaw porosity C of the frozen earth formation, providing a signal corresponding to excess ice $I_{ex}$ in the earth formation in accordance with the $I_V$ signal and the porosity signal C and the following equation:

$$\text{EXCESS ICE} = I_V - C,$$

integrating the excess ice signal with respect to the distance signal, providing pulses corresponding to the integration, counting the integration pulses, and providing a signal in accordance with the counted pulses as the subsidence signal.

7. A method as described in claim 6 further comprising a step of recording the subsidence signal.

8. A method as described in claim 7 which further comprises the steps of recording the pulse rate signal, the density signal, the percent volume ice signal, and the excess ice signal.

* * * * *